No. 647,743. Patented Apr. 17, 1900.
H. COCHRANE.
ELECTRIC MOTOR CONTROLLER.
(Application filed June 15, 1899.)
(No Model.) 3 Sheets—Sheet 1.
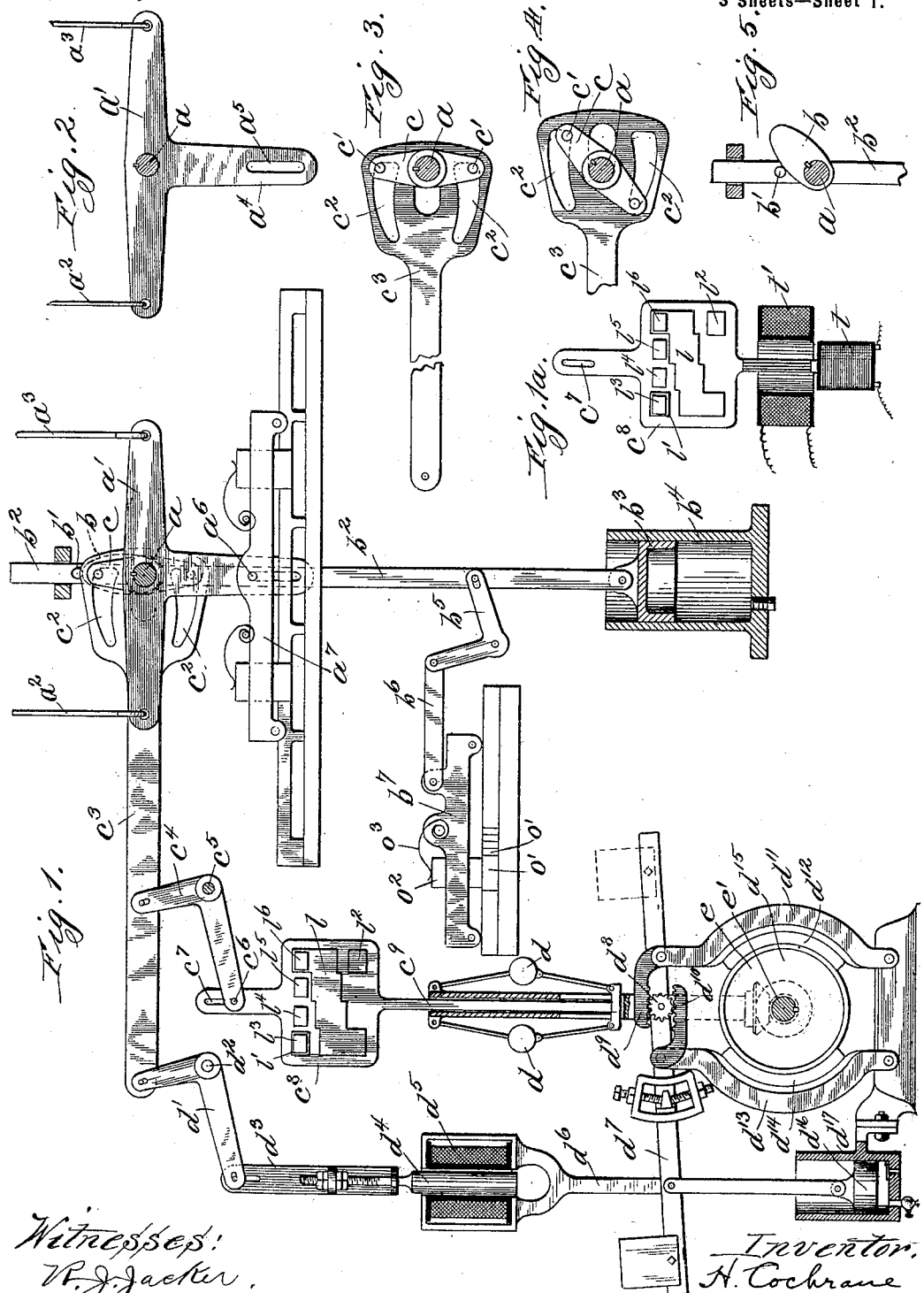

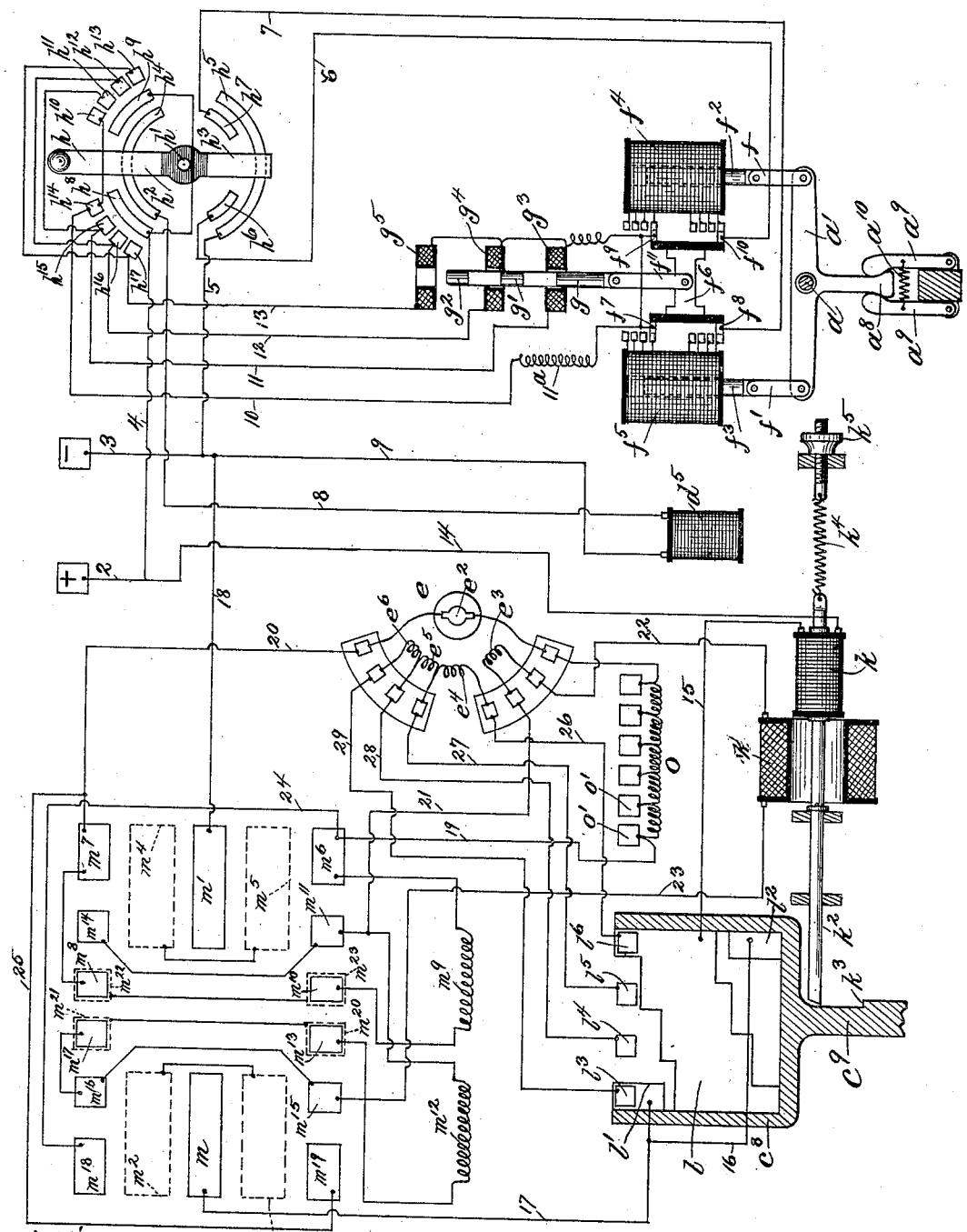

No. 647,743. Patented Apr. 17, 1900.
H. COCHRANE.
ELECTRIC MOTOR CONTROLLER.
(Application filed June 15, 1899.)
(No Model.) 3 Sheets—Sheet 3.
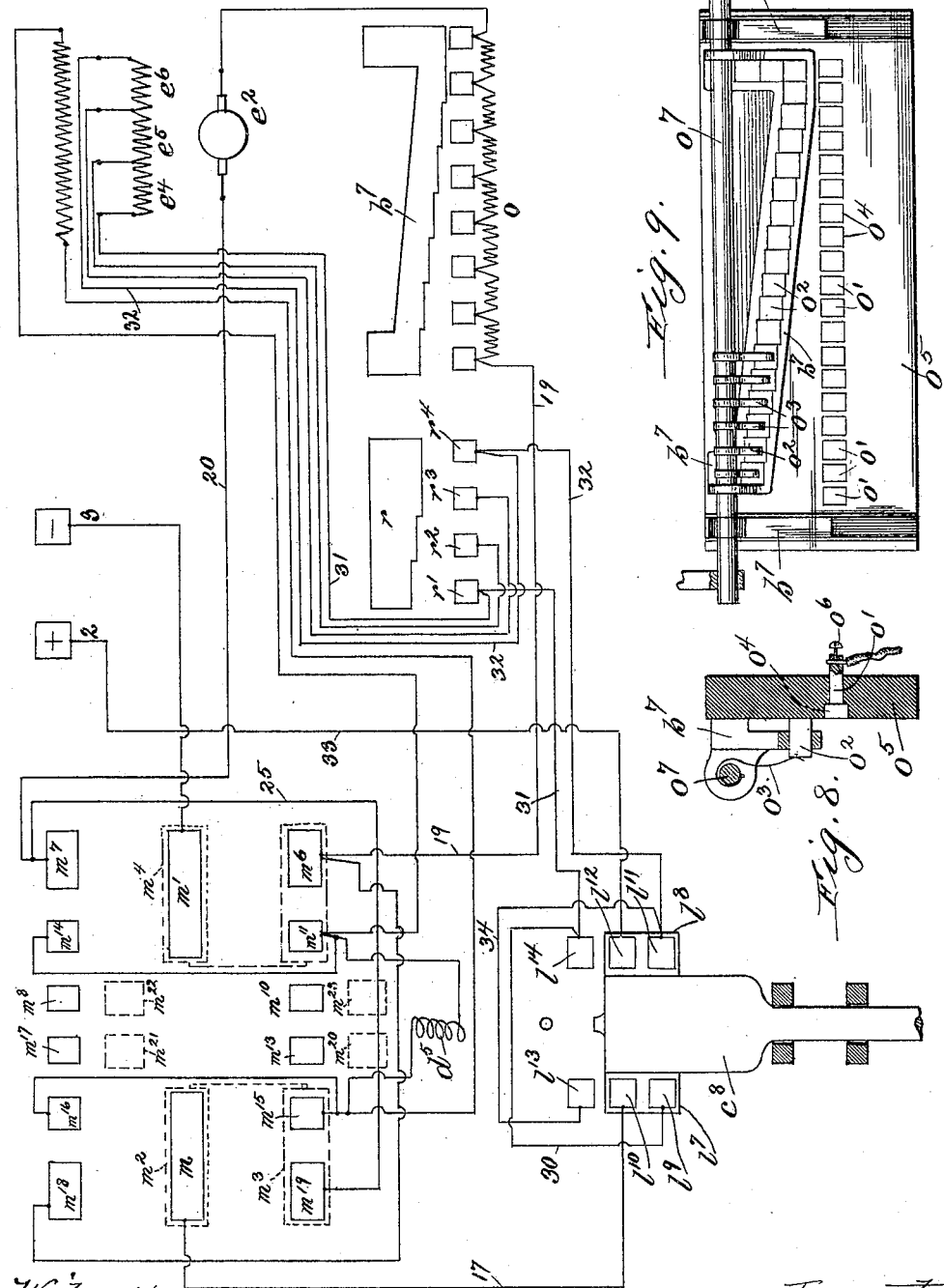

UNITED STATES PATENT OFFICE.

HAYWARD COCHRANE, OF CHICAGO, ILLINOIS.

ELECTRIC-MOTOR CONTROLLER.

SPECIFICATION forming part of Letters Patent No. 647,743, dated April 17, 1900.

Application filed June 15, 1899. Serial No. 720,650. (No model.)

*To all whom it may concern:*

Be it known that I, HAYWARD COCHRANE, a citizen of the United States, residing at Chicago, in the county of Cook and State of Illinois, have invented certain new and useful Improvements in Electric-Motor Controllers, of which the following is a full, clear, concise, and exact description, reference being had to the accompanying drawings, forming a part of this specification.

My invention relates to an electric-motor controller, my object being to provide means whereby the motor may be readily controlled in stopping and starting the same.

In practicing my invention I provide a motor having a series-field winding, usually a compound-wound motor having, in addition to the series-field winding, a shunt-winding. In order that the speed of the motor in starting may be increased gradually, I provide means for cutting out the series-field coils step by step to thereby decrease the strength of the field and permit the armature to increase in speed. I also provide means whereby the series-field coils may be connected in circuit in reverse position, whereby when the motor begins to run as a generator the series-field coils will be connected in circuit in reversed direction to thereby build up a strong field, which will serve to reduce the speed of the armature. When a compound-wound motor is employed, the current through the shunt-field remains the same whether the motor is running as a motor or as a generator, and the two fields are thus added. When the motor runs as a generator, the current through the series-field winding would be reversed and would thus act in opposition to the shunt-winding, and in order to avoid this I provide means whereby the series-field winding may be reversed in position, so that the current will flow therethrough when the motor acts as a generator in a direction to assist the shunt-winding. I preferably provide automatic means, as hereinafter described, for cutting the series-field coils into and out of circuit. I provide means responsive to the speed of the motor or to the current flowing through the armature adapted to be operated to reverse the connections of the series-field windings, so that so soon as the speed increases to the point where the motor acts as a generator, or so soon as the current in the armature falls to zero or is reversed, the means are thrown into operation to reverse the connections of the series-field winding. By arranging the windings in sections a greater or less number of sections may be included in circuit, according to the load upon the motor.

During the operation of the dynamo-electric machine it operates as a motor or as a generator, according to the size of the load. When the elevator-car is descending with a heavy load, it frequently happens that the weight of the car and its load serves to drive the armature of the motor at such a speed that it begins to act as a generator and send the current back over the supply-circuit. In order to utilize the motor as a brake to check and govern the movement of the car under these conditions, I am enabled in accordance with the present invention to connect the series-field winding in circuit in one direction when the machine operates as a motor, whereby the series field coöperates with the shunt-field, and as it is desired to increase the speed of the machine the series field may be gradually removed from circuit, and when the electromotive force of the motor equals the electromotive force of the supply-circuit the series field is entirely short-circuited, and as the speed continues to increase, causing the machine to act as a generator, the connections of the series field are automatically reversed and connected in circuit gradually or step by step as the speed increases, thereby gradually checking the speed of the armature. As the speed decreases the series winding is gradually removed from the circuit, and when the counter electromotive force of the machine equals the counter electromotive force of the line the series winding is again short-circuited and is then connected in circuit in the original direction, as the speed further decreases and the machine operates as a motor. In this manner I am enabled to obtain a perfect control of the motor during the descent of the car, and the machine, acting alternately as a motor and as a generator, serves to closely regulate the speed of the car or other load with which the machine is employed.

My invention also contemplates other improvements, as hereinafter more particularly described.

I have illustrated my invention in the accompanying drawings in connection with a motor adapted more particularly to be used in connection with an elevator system.

Figure 1 is a view illustrating the mechanical construction of the controller. Fig. 1$^a$ is a view of one form of the series-field reverser. Figs. 2, 3, 4, and 5 are detail views of the mechanical construction. Fig. 6 is a diagrammatic view illustrating the circuit arrangements. Fig. 7 is a diagram illustrating a modification. Fig. 8 is a detail view of the form of stationary and movable contacts employed. Fig. 9 is a plan view of the rheostat and contact-bar employed therewith.

Like letters and numerals refer to like parts in the several figures.

Upon the shaft $a$ is mounted the bar $a'$, to the ends of which are secured the operating-ropes $a^2$ $a^3$, by means of which the operator may control the motor. Instead of employing the ropes $a^2$ $a^3$ the bar $a'$ may be rocked by electrical means, as hereinafter described. The bar $a'$ carries an arm $a^4$, having a slot $a^5$, in which fits a pin $a^6$, carried upon the frame $a^7$ of the reversing and controlling switch of the motor. When the bar $a'$ is rocked in one direction or the other, the frame $a^7$ of the reversing-switch is carried to one side or the other through the engagement of the arm $a^4$ with the pin $a^8$. Upon the shaft $a$ is keyed the cam $b$, adapted to engage a pin or roller $b'$, carried upon the upright bar $b^2$, to the lower end of which is secured the piston $b^3$ of the dash-pot $b^4$. When the cam $b$ is removed from the central position, the bar $b^2$ is permitted to descend, and through the agency of the bell-crank $b^5$ and link $b^6$ the frame $b^7$ of the rheostat and series field commutating-switch are moved to carry the contacts of the same over the terminals. Upon the shaft $a$ a bar $c$ is keyed, carrying at the ends pins $c$ $c'$, fitting in slots $c^2$ $c^2$, provided in the bar $c^3$. When the shaft is rocked in one direction, the upper pin $c'$ engages and moves the bar $c^3$ to the right, and when the shaft is moved in the opposite direction the lower pin $c'$ engages and moves the bar $c^3$ to the right, so that the bar $c^3$ is moved to the right regardless of the direction in which the shaft is rotated. To the bar $c^3$ is connected the bell-crank $c^4$, pivoted at $c^5$, the opposite arm of the bell-crank carrying a pin $c^6$, which fits in a slot $c^7$, carried in a plate or frame $c^8$. The plate $c^8$ carries contacts, as hereinafter described, and is associated with a centrifugal governor $d$, geared with the shaft $e'$ of the electric motor $e$, so that as the speed of the motor increases the governor-balls are moved outward to elevate the rod $c^9$, upon the upper end of which the frame $c^8$ is carried. The frame may be associated with a magnetic controller, as hereinafter described. When the bar $c^3$ is in the position shown in Fig. 1, the bell-crank $c^4$ locks the frame $c^8$ in position. When, however, the bar $c^3$ is moved to the right, the pin $c^6$ is moved upward in the slot $c^7$, thus freeing the frame $c^8$ and permitting the same to ascend under the action of the governor. To the bar $c^3$ is also connected the bell-crank $d'$, pivoted at $d^2$, the other arm of the bell-crank being connected with the bar $d^3$, which carries upon the lower end the core $d^4$ of the brake-magnet or solenoid $d^5$. Magnet $d^5$ is carried upon the end of an arm or frame $d^6$, which is pivoted to the bar $d^7$, carrying a pinion $d^8$, meshing with racks $d^9$ and $d^{10}$. The rack $d^9$ is connected with the pivoted frame $d^{11}$, carrying the brake-shoe $d^{12}$, and the rack $d^{10}$ is connected with the pivoted frame $d^{13}$, carrying the brake-shoe $d^{14}$. The brake-shoes are adapted to engage a disk $d^{15}$, carried upon the shaft $e'$ of the motor. The bar $d^7$ is connected with the piston $d^{16}$ of a dash-pot $d^{17}$. When the magnet $d^5$ is deënergized, the magnet occupies the position shown in Fig. 1, in which case the pinion $d^8$ is rocked to hold the brake-shoes upon the brake-disk. When the magnet is energized and the bar $d^3$ is raised, the magnet and its core ascend, thereby rocking the pinion $d^8$ and carrying the brake-shoes out of engagement with the brake-disk.

Instead of relying upon the ropes $a^2$ $a^3$ for operating the bar $a'$ an electrical controller may be employed, as illustrated in Fig. 6, in which the ends of the bar $a'$ are illustrated as connected by links $f f'$ with the cores $f^2 f^3$ of the solenoids or magnets $f^4 f^5$, respectively. The solenoids $f^4 f^5$ are wound in sections. A cross-head $f^6$ carries at one end brushes $f^7 f^8$, adapted to move over the terminals connected with the windings of magnet $f^5$. The cross-head carries at the other end brushes $f^9 f^{10}$, adapted to move over the terminals connected to the windings of the solenoid or magnet $f^4$. The cross-head $f^6$ is connected by a link $f^{11}$ with the series of cores $g$ $g'$ $g^2$, joined together, but separated by pieces of magnetic insulation, the cores being situated to be influenced by the windings $g^3$, $g^4$, and $g^5$, respectively. The manual switch-arm $h$, pivoted at $h'$, is adapted to be moved by the operator and is placed at a convenient location in the elevator-car when used in connection with an elevator or in other convenient positions, if otherwise employed. The lever comprises two parts $h^2$ and $h^3$, insulated from each other, the former continuously engaging contact-plate $h^4$, while the latter continuously engages contact-plate $h^5$. On opposite sides of the central position of the lever plates $h^6$ $h^7$ are provided, adapted to be engaged by the part or brush $h^3$ when moved in one direction or the other. Plates $h^8$ and $h^9$ are arranged to be engaged by the part $h^2$, as are also the terminals $h^{10}$ $h^{11}$ $h^{12}$ $h^{13}$ upon one side and the terminals $h^{14}$ $h^{15}$ $h^{16}$ $h^{17}$ upon the other side. The main 2 is connected by a conductor 4 with the plates $h^8$ and $h^9$, while the main 3 is connected by a conductor 5 with the plate $h^5$. The plate $h^6$ is connected by conductor 6 with brush $f^{10}$, while the plate $h^7$ is connected by conductor 7 with the brush $f^8$. The plate $h^4$ is connected by conductor 8 with the brake-magnet $d^5$, the opposite end of the brake-magnet being connected by conductor 9 with the main 3. The terminals $h^{10}$ and $h^{14}$ are connected by conductor 10, through resistance $11^a$, with brushes $f^7$ and $f^9$. Terminals $h^{11}$ and $h^{15}$ are connected by conductor 11 with one end of winding $g^3$, the other end of the winding being connected with brush $f^9$. Terminals $h^{12}$ and $h^{16}$ are connected by conductor 12 with one end of winding $g^4$, while terminals $h^{13}$ and $h^{17}$ are connected by conductor 13 with one end of winding $g^5$, the other ends of these windings $g^4$ and $g^5$ being connected with brush $f^9$. In order to maintain the bar $a'$ normally in a horizontal position, as shown in Fig. 6, an arm $a^8$ is provided, against which rest the pivoted levers $a^9$ $a^9$, joined together by a spring $a^{10}$. This construction serves to return the bar $a'$ to its normal position when moved to one side or the other and released, the spring $a^{10}$ acting to draw the bar $a'$ into its normal position.

When it is desired to start the motor, the arm $h$ is moved to one side or the other, according as it is desired to drive the motor in one direction or the other. If the arm $h$ be moved to the right, as shown in Fig. 6, contact-plates $h^4$ and $h^9$ are electrically connected, and currents from main 2 passes over conductor 4, through plates $h^9$ and $h^4$, conductor 8, through the coil $d^5$, and thence by conductor 9 to main 3. The brake-magnet is thus energized to withdraw the brake-shoe from the brake-disk. Movement of arm $h$ into contact with terminal $h^{10}$ sends current from main 2 over conductor 4, plate $h^9$, terminal $h^{10}$, conductor 10, resistance 11, brush $f^9$, winding of magnet $f^4$, conductor 6, plate $h^6$, plate $h^5$, and thence by conductor 5 to main 3. Magnet $f^4$ being thus energized, core $f^2$ is attracted through a short distance to rock the bar $a'$ and the motor is started. When it is desired to increase the speed of the motor, arm $h$ is moved to terminal $h^{11}$, thereby closing circuit over conductor 11 through winding $g^3$, brush $f^9$, magnet $f^4$, and conductor 6 to the opposite side of the line. Magnet $g^3$ is thus energized and attracts core $g$, thereby raising cross-head $f^6$ and moving brushes $f^9$ and $f^{10}$ into engagement with the next set of terminals, thereby connecting in circuit a second winding of magnet $f^4$, which has its center of magnetism above that of the first winding, whereby core $f^2$ is moved through another short distance to rock bar $a'$ accordingly. By moving arm $h$ into contact with terminal $h^{12}$ circuit is closed through winding $g^4$, and the cross-head $f^6$ is again raised, thereby energizing the third winding of magnet $f^4$ and rocking arm $a'$ through another short distance. Likewise, when arm $h$ is moved into contact with terminal $h^{13}$ winding $g^5$ is energized to raise cross-head $f^6$ and connect in circuit the highest winding of magnet $f^4$, thereby energizing the same to rock bar $a'$ into its extreme position. When it is desired to start the motor in the opposite direction, the arm $h$ is moved to the left successively into engagement with the various terminals, thereby successively energizing the several windings of magnet $f^5$ to cause the bar $a'$ to be rocked in the opposite direction step by step.

The main 2 is connected by conductor 14 through magnet $k$, and thence by conductor 15 with the plate $l$, carried upon and insulated from the frame $c^3$. The frame also carries plates $l'$ $l^2$, insulated from the plate $l$. The plates $l'$ and $l^2$ are connected together by conductor 16 and are connected by conductor 17 with the plate $m$ of the reversing-switch. The opposite main 3 is connected by conductor 18 directly with plate $m'$. A pair of electrically-connected contact-blocks $m^2$ $m^3$ are arranged to be moved into engagement with plate $m$, according as the same are moved in one direction or the other, and corresponding contact-blocks $m^4$ $m^5$ are arranged to engage the plate $m'$. The plate $m^6$ with which the contact $m^5$ is adapted to engage is connected by conductor 19 with the rheostat $o$, and thence with the armature $e^2$ of the motor $e$, the other side of the armature being connected by conductor 20 with plate $m^7$, and plate $m^6$ is connected through resistance $m^9$ with plate $m^{10}$. Plate $m^{11}$ is connected through resistance $m^{12}$ with plate $m^{13}$, and plate $m^{11}$ is also connected with plate $m^{14}$. Plate $m^{11}$ is connected by conductor 21 with the shunt-field winding $e^3$, the other end of the winding being connected by conductor 22 through magnet $k'$, and thence by conductor 23 with plate $m^{15}$, which plate is connected with plates $m^{16}$ and $m^{17}$. Plate $m^{18}$ is connected by conductor 24 with plate $m^6$, and plate $m^7$ is connected by conductor 25 with plate $m^{19}$. Plates $m^{13}$ and $m^{17}$ are adapted to be engaged by contact-blocks $m^{20}$ and $m^{21}$, (shown in dotted lines in Fig. 6,) and plates $m^8$ and $m^{10}$ are adapted to be engaged by contact-blocks $m^{22}$ and $m^{23}$. The contact-blocks $m^{20}$ and $m^{21}$ are electrically connected together, as are also blocks $m^{22}$ and $m^{23}$. Plates $m^7$ and $m^8$ are likewise connected. The series field-coil of the motor is arranged in sections $e^4$ $e^5$ $e^6$, the end of section $e^4$ being connected by conductor 26 with brush $l^6$, while the other end is connected by conductor 27 with brush $l^5$. The end of section $e^5$ is connected by conductor 28 with brush $l^4$, and the end of section $e^6$ is connected by conductor 29 with brush $l^3$.

A locking device is provided in connection with the frame $c^8$, which is raised through the agency of the governor, the locking device comprising a rod $k^2$, guided in suitable supports and carrying the magnet $k$, the end of the rod $k^2$ being arranged to engage a lug or shoulder $k^3$, provided upon the bar $c^9$. The rod $k^2$ is connected with spring $k^4$, which, by means of thumb-screw $k^5$, can be adjusted in tension. The lug $k^3$ is so situated that when the rod $k^2$ is moved to the right by means of the spring $k^4$ the frame $c^8$ may be moved upward without hindrance. When, however, the rod $k^2$ is moved to the left, the end thereof is in position to engage the lug $k^3$ and limit the upward movement of the frame $c^8$.

The rheostat $o$ is provided with a series of terminals $o'$ $o'$, with which engage a series of contact brushes or blocks $o^2$ $o^2$. The contact-brushes $o^2$ are preferably made of carbon or copper and are mounted upon a frame $b^7$. The line of brushes $o^2$ $o^2$ extend oblique to the line of terminals $o'$ $o'$, so that as the frame $b^7$ is moved the sections of the rheostat are successively short-circuited, thereby cutting out resistance, and upon moving in the opposite direction the sections of the rheostat are successively cut into circuit. A spring $o^3$ is provided in connection with each of the blocks $o^2$, arranged to rest thereon and resiliently press the same against the terminals $o'$.

In Fig. 8 I have illustrated the preferred construction of terminal and contact-brush, the terminal $o'$ having a head $o^4$ and extending through the supporting-plate $o^5$ and carrying the binding-screws $o^6$ upon the rear end. The head $o^4$ of the terminal is set into the supporting-plate so as to be flush, or nearly so, with the surface thereof. The contact-block $o^2$ is carried on the frame $b^7$, and the spring $o^3$ is wound around a shaft $o^7$, the end thereof touching upon the contact-block to press the same against the terminal.

When it is desired to start the motor, the controlling-bar $a'$ is rocked upon its journal by means of the hand-ropes $a^2$ $a^3$ (shown in Fig. 1) or by means of the controlling-switch $h$, (shown in Fig. 6,) as hereinbefore described, the bar $a'$ being rocked in one direction or the other, according to the direction it is desired to drive the motor. The rocking of the bar $a'$, and consequently the shaft $a$, carries the bar $c^3$ to the right through the agency of the bar $c$ and the pins $c'$ $c'$, and this movement rocks the bell-crank $c^4$ to unlock the frame $c^8$, controlled by the governor $d$, and also rocks the bell-crank $d'$ to release the brake. The rocking of the shaft $a$ moves the reversing and controlling switch over the terminals thereof to close circuit through the motor, as hereinafter described, and through the agency of the cam $b$ and pin $b'$ the bar $b^2$ is moved to carry the rheostat-brushes over the terminals to remove the armature-resistance. Considering that the controlling-switch is moving in such a direction as to carry the contact-plates $m^2$ and $m^4$ into contact with plates $m$ and $m'$, then contact-plate $m^3$ will be moved into engagement with the plates $m^{15}$ and $m^{19}$, and plate $m^5$ will be moved into engagement with plates $m^6$ and $m^{11}$. The same movement will carry contact-blocks $m^{21}$ and $m^{22}$ out of engagement with plates $m^{17}$ and $m^{18}$ and will also carry contact-plates $m^{20}$ and $m^{23}$ out of engagement with contact-plates $m^{13}$ and $m^{10}$. Circuit may now be traced from terminal 2 over conductor 14, magnet $k$, conductor 15, plate $l$, brush $l^6$, conductor 26, sections $e^4$, $e^5$, and $e^6$ of the series field, conductor 29, brush $l^3$, plate $l'$, conductor 17, plate $m$, plate $m^2$, plate $m^3$, plate $m^{19}$, conductor 25, conductor 20, armature $e^2$, resistance $o$, conductor 19, plate $m^6$, plate $m^5$, plate $m^4$, conductor 18 to main 3. Current is thus closed through the armature and the series-field coils and through the armature-resistance. The circuit through the shunt-field may be traced from plate $m^{15}$ through conductor 23, magnet $k'$, conductor 22, field-winding $e^3$, conductor 21 to plate $m^{11}$. The motor is thus started with all of the armature-resistance in circuit and with all of the series-field sections in circuit. As the speed of the motor increases, the governor raises the frame $c^8$, to thereby cut out the series-field sections one by one. When the frame $c^8$ has been raised to move plate $l$ into engagement with brush $l^5$, the first section $e^4$ of the series field is short-circuited and removed from circuit. When plate $l$ engages plate $l^4$, section $e^5$ is short-circuited, and when brush $l^3$ is engaged by plate $l$ section $e^6$ is short-circuited and the series-field coils are removed wholly from circuit. According as the controlling-bar $a'$ is moved to a greater or less extent, the resistance of the rheostat $o$ is removed from circuit to thereby increase the current through the armature. When the speed of the armature rises above a prearranged value, the continued upward movement of the plate $l$ serves to connect the series-field coils in circuit again, but in the reversed direction. Thus as the plate $l$ continues its upward movement the brush $l^6$ is moved into contact with plate $l^2$ while brush $l^5$ is still in engagement with plate $l$, thereby connecting winding $e^4$ in circuit in the reversed direction, and as the brushes $l^5$ and $l^4$ successively pass from plate $l$ coils $e^5$ and $e^6$ are connected in circuit, and when brush $l^5$ alone rests on plate $l$ and brush $l^6$ rests on plate $l^2$ all of the series-field coils are connected in circuit in the reversed direction. By this arrangement when the motor tends to pass a prearranged speed—as, for instance, when an elevator-car is connected with the motor and is descending with a load and the tendency is to run the motor at a high speed due to the weight of the car, in which case it would tend to become a generator—the current through the series-field coils passes in the reversed direction, whereby a strong field is produced in such a direction as to coact with the shunt-field, and the armature being thus rotated in a strong field the field acts as a brake to retard the motion of the car. It will be noted that when the motor is running as a motor, with the series and shunt-field coils in circuit, the series and shunt coils are traversed by current in such a direction that the magnetic fields are added. When, however, the motor begins to run as a generator, the current through the shunt-field will continue to be in the same direction, while the current through the series coils would be reduced to zero, and then if the speed continued to increase the current would flow in a reversed direction, in which case the series and shunt coils would oppose each other. To permit the series coils to assist the shunt-coils, I arrange to reverse the position of the series coils, whereby the current from the motor acting as a generator traverses the coils in a reversed direction and, in consequence, in a direction to assist the shunt-winding. By this arrangement the series coils may be used to assist the shunt-coils in building up a strong field during the starting of the motor, the series coils being removed from circuit to permit the speed of the armature to build up, while the series coils may be connected in circuit again in the reversed direction when the speed rises above the prearranged value—that is, above the value where the motor tends to operate as a generator—to again build up a strong field which will serve to retard the movement of the armature, thereby acting as a magnetic brake. Thus it will be seen that the series-field coils are all in circuit at starting, are cut out step by step as the speed increases, and are at a prearranged speed all removed from circuit, and the motor runs as a simple shunt-motor. When the motor begins to run as a generator, the series-field coils are cut into circuit in the reversed position one at a time, whereby as the speed as a generator increases the field is strengthened to thereby oppose the increase of speed. The number of series coils in circuit in reversed position will depend on the load. On light load the motor may run with all of the series coils removed from circuit, while with heavier loads one or more of the coils may be included in circuit, according to the magnitude of the load.

In order that during the operation of the motor as a motor the series-field coils may not be reconnected in circuit, I provide a locking mechanism. (Illustrated in Fig. 6.) It will be noted that the magnet $k$, carried upon the rod $k^2$, is in series with the armature, while the magnet $k'$, which is held in a stationary position, is connected in shunt with the armature. The windings of the magnets $k$ and $k'$ are arranged so that the magnets are normally attracted against the tension of spring $k^4$ to hold the end of rod $k^2$ in position to engage lug $k^3$, thereby limiting the upward movement of the plate $l$ and preventing the same from connecting the series-field coils in circuit in the reversed direction. When, however, the motor begins to operate as a generator and the current through the coil $k$ in series with the armature is reversed, the magnets repel each other, and assisted by spring $k^4$ the rod $k^2$ is moved back out of the path of lug $k^3$, whereby the continued upward movement of plate $l$ is permitted to connect the series-field coils in circuit in the reversed direction.

It will be observed that in the position shown in Fig. 6 the shunt-field is connected in a short or closed circuit through the resistance $m^{12}$. This circuit may be traced from shunt-coil $e^3$ through conductor 21, through resistance $m^{12}$, plate $m^{13}$, contact-block $m^{20}$, contact-block $m^{21}$, plate $m^{17}$, plate $m^{16}$, plate $m^{15}$, conductor 23, magnet $k'$, and conductor 22 back to the shunt-field winding $e^3$. When the controlling-switch is moved to close circuit through the motor, contact-blocks $m^{20}$ and $m^{21}$ are moved out of engagement with plates $m^{13}$ and $m^{17}$, respectively, whereby this shunt or closed circuit is opened. Likewise when the controlling-switch is operated to open the motor-circuit the blocks $m^{20}$ and $m^{21}$ are moved into position to complete the closed circuit, whereby the surge due to the self-induction of the shunt-field winding is permitted to fritter itself away in a closed circuit including the resistance $m^{12}$, and since the contact-blocks engage the terminals before the motor-circuit is opened the self-induced current due to the shunt-field winding is prevented from producing a spark, as would be the case were the circuit opened.

When the motor is at rest, the armature of the motor is likewise connected in a closed circuit through the agency of the contact-blocks $m^{22}$ and $m^{23}$. This circuit may be traced from the armature $e^2$ of the motor through conductor 20, plate $m^7$, plate $m^8$, block $m^{22}$, block $m^{23}$, plate $m^{10}$, resistance $m^9$, plate $m^6$, conductor 19, rheostat $o$ and back to the armature. This closed circuit is completed just prior to the opening of the main circuit by the controlling-switch, so that the armature-circuit instead of being broken is closed through resistance $m^9$, whereby the current flowing therethrough is permitted to fritter itself away instead of producing a destructive spark, as would be the case were the armature-circuit completely opened.

In Fig. 7 I have illustrated diagrammatically a modification of the invention in which the frame $c^8$, instead of carrying contact-plates arranged to connect the series field-coils in circuit step by step, is arranged to connect all of the series-field coils in circuit at once and is so arranged that the coils can be connected in the reversed direction. Upon the frame $c^8$ are carried the contact-plates $l^7$ and $l^8$. When the frame is in the lowered position, plate $l^7$ engages brushes $l^9$ and $l^{10}$, while plate $l^8$ engages brushes $l^{11}$ and $l^{12}$. When frame $c^8$ is moved into the upper position, the plate $l^7$ engages brushes $l^{10}$ and $l^{13}$ while plate $l^8$ engages brushes $l^{12}$ and $l^{14}$. In addition to the automatic controller a hand-controller is provided comprising a contact-plate $r$, arranged to be moved into engagement with a series of terminals $r'$ $r^2$ $r^3$ $r^4$, whereby the series-field windings $e^4$ $e^5$ $e^6$ may be cut into or out of circuit by hand. When the series coils are left under the control of the automatic controller, the contact-bar $r$ is moved into a position out of contact with the terminals $r'$ to $r^4$. The circuit through the series-field coils may be traced from main 3 through plates $m'$ $m^6$, conductor 19, rheostat $o$, armature $e^2$, conductor 20, conductor 25, plate $m^{10}$, plate $m$, over conductor 17, through plates $l^{10}$, $l^7$, and $l^9$, thence by conductors 30 and 31 through windings $e^4$, $e^5$, and $e^6$, conductor 32, plates $l^{11}$, $l^8$, and $l^{12}$, and conductor 33. All of the field-coils are thus in series with the armature. When the frame $c^8$ is moved into the upper position, circuit may be traced from main 3 through the armature, as before, and thence over conductor 17, through plates $l^{10}$, $l^7$, and $l^{13}$, conductors 34 and 32, through the series-field coils $e^6$, $e^5$, and $e^4$, conductor 31, plates $l^{14}$, $l^8$, and $l^{12}$, and thence by conductor 33 to main 2. Circuit is thus closed through the armature $e^2$ in the same direction as before, while the series-field coils are reversed in position, so that the current traverses the same in the opposite direction. By means of the hand contact-bar $r$ any number of the series-field coils may be left in circuit to be controlled by the automatic mechanism.

In Fig. 1$^a$ I have illustrated a modification in which the frame $c^8$ is moved by magnetism instead of by a centrifugal governor. The frame carries a winding $t$, and in the field thereof is a stationary winding $t'$. The magnet $t$ is connected in series with the armature, while the winding $t'$ is connected in shunt. Normally the two windings repel each other. When the motor ceases to run as a motor, the current comes to zero in coil $t$, which allows coil $t'$ to attract the core of magnet $t$, thus raising frame $c^8$ to first cut out the series-field coils step by step, and to then connect the coils in circuit in reverse position step by step. The reversing device is thus responsive to the action of the current through the armature, and hence is operated when the motor ceases to operate as a motor and begins to operate as a generator. When the current through coil $t$ is reversed, coils $t$ and $t'$ attract, thereby assisting in raising the frame $c^8$. Since the motor does not act as a generator until the speed exceeds a certain value, the reversing device is also responsive to the speed of the armature of the motor.

Having described my invention, what I claim as new, and desire to secure by Letters Patent, is—

1. The combination with a dynamo-electric machine arranged to be run as a motor or as a generator, of a series-field winding therefor, and means for automatically reversing the connections of the series-field winding when the machine runs as a generator, substantially as described.

2. The combination with a compound-wound dynamo-electric machine arranged to be run as a motor or as a generator according to the load, and having a shunt-winding and a series winding, of means for permitting the reversal of the connections of the series-field winding when the machine runs as a generator, substantially as described.

3. The combination with a compound-wound motor having a shunt-field winding and a series-field winding, of means responsive to the speed of the motor for reversing the connections of the series-field winding when the speed arrives at a prearranged value, substantially as described.

4. The combination with a motor having a series-field winding, of means arranged to be operated by the current when the motor ceases to run as a motor and begins to run as a generator for reversing the connections of the series-field winding, substantially as described.

5. The combination with a motor having a series-field winding, of magnetic means operated by the reversal of the current through the armature for reversing the connections of the series-field winding, substantially as described.

6. The combination with a compound-wound motor having a shunt and a series field winding, of means for cutting out the series-field winding as the speed of the motor increases, and means for connecting the series-field winding in circuit in reversed position when the speed of the motor rises above a prearranged value, substantially as described.

7. The combination with a compound-wound motor arranged to run as a motor or as a generator, and having a shunt-winding and a series-field winding arranged in sections, of means for successively cutting out the sections of the series-field winding as the speed of the motor increases, and means for successively connecting said sections in circuit in reversed position when the motor runs as a generator, substantially as described.

8. The combination with a compound-wound motor having a shunt and a series field winding, of means for connecting the series winding in circuit section by section in reversed direction when the speed of the motor rises above a prearranged value, substantially as described.

9. The combination with a compound-wound motor having a shunt and a series field winding arranged in sections, of means responsive to the speed of the motor for cutting the sections out step by step and then as the speed increases cutting the same into circuit step by step in reversed position; substantially as described.

10. The combination with a motor having a series-field winding arranged in sections, of means responsive to a reversal of current through the armature for cutting out the sections step by step and for then connecting the same in circuit step by step in reversed position.

11. The combination with a motor having a series-field winding arranged in sections, of means operated by the current when the motor ceases to run as a motor and begins to run as a generator for connecting the sections in circuit step by step in reversed position, substantially as described.

12. The combination with an electric motor, of a brake therefor, an electromagnet and its core interposed between the different parts of the mechanism for operating the brake, and means for closing circuit through said electromagnet when the motor is started and for opening the circuit therethrough when the motor is stopped, substantially as described.

13. The combination with a pair of main electromagnets wound in sections, of a traveling contact device for connecting different sections in circuit, a plurality of operating-electromagnets for moving said contact device and a switching device for closing circuit through either of said main electromagnets and for successively closing circuit through the operating-electromagnets, substantially as described.

14. The combination with a pair of main electromagnets wound in sections, of terminals with which the ends of the sections are respectively connected, a traveling cross-head carrying contacts adapted to engage the terminals to connect the different sections in circuit, a plurality of operating-electromagnets and cores for the respective electromagnets mounted to move with said cross-head and a switch for closing circuit through either of said main electromagnets and for connecting the several operating-electromagnets in circuit, substantially as described.

15. The combination with a pair of main electromagnets wound in sections, of terminals with which the ends of the respective sections are connected, a traveling cross-head, a pair of contacts mounted thereon arranged to engage the terminals belonging to one electromagnet and a second pair of contacts carried thereon and arranged to engage the terminals belonging to the other electromagnet, one contact of each pair being connected respectively with switching contacts arranged to be engaged by the contact-arm according as the same is moved in one direction or the other, the other contacts of each pair being electrically connected together and electrically connected with one end of each of a plurality of operating-electromagnets for moving said cross-head, the other ends of said operating-electromagnets being connected respectively with a series of terminals adapted to be successively engaged by the contact-arm of the switch, substantially as described.

16. The combination with a dynamo-electric machine arranged to be connected with the load to run as a generator or as a motor according to the size of the load and having a shunt-winding and a series winding, of means for automatically reversing the connections of the series-field winding when the machine operates as a generator, substantially as described.

17. The combination with a dynamo-electric machine arranged to be connected with the load to run as a generator or as a motor according to the size of the load, and having a shunt and a series field winding, of means for connecting the series field in one direction when the machine operates as a motor, for short-circuiting the series field when the counter electromotive force of the motor equals the electromotive force of the supply-circuit and for reversing the connections of the series field when the machine operates as a generator, substantially as described.

18. The combination with a dynamo-electric machine arranged to be connected with the load to run as a generator or as a motor according to the size of the load and having a shunt-winding and a series winding, of means for connecting the series-field winding in one direction when the machine operates as a motor and for reversing the connection of the series-field winding when the machine operates as a generator, substantially as described.

19. The combination with a dynamo-electric machine arranged to be connected with the load to run as a generator or as a motor according to the size of the load and having a shunt-winding and a series winding, of means for gradually cutting out said series winding as the speed increases, for reversing the connections of the series field when the machine operates as a generator and for gradually cutting in the series field as the speed continues to increase, substantially as described.

20. The combination with a dynamo-electric machine arranged to be connected with the load to run as a generator or as a motor according to the size of the load and having a shunt-winding and a series winding, of means for gradually cutting out the series winding as the speed increases, for short-circuiting the same when the counter electromotive force of the machine equals the electromotive force of the supply-circuit, for reversing the connections of the series winding when the machine operates as a generator and for gradually cutting in the series winding as the speed continues to increase, substantially as described.

21. The combination with a dynamo-electric machine arranged to be run as a motor or as a generator, of a series-field winding therefor, and means for automatically reversing the connections of the series-field winding when the machine runs at a speed above a prearranged value, substantially as described.

In witness whereof I have hereunto subscribed my name in the presence of two witnesses.

HAYWARD COCHRANE.

Witnesses:
W. CLYDE JONES,
PERCY C. GILL.